United States Patent Office 2,930,830
Patented Mar. 29, 1960

2,930,830

SOLID-STATE CELL AND BATTERY

Harry C. Lieb, Rockville Centre, and John A. De Rosa, Jamaica, N.Y., assignors to Leesona Corporation, a corporation of Massachusetts No Drawing. Application April 22, 1958
Serial No. 730,059

8 Claims. (Cl. 136—153)

This application is a continuation-in-part of our application Serial No. 526,055, filed August 2, 1955, and now abandoned.

This invention relates to primary electro-chemical cells which consist entirely of solid components and to solid-state batteries which comprise an assembly of such cells. Present day electronic circuitry frequently requires a source of relatively high voltage but low total current, and in many applications it is desirable to supply these requirements with a miniature battery, provided that reliable operation can be obtained over an extended period of time. The batteries provided by this invention are particularly suited to fulfill such requirement since in addition to improvements in voltage and total current characteristics, we have also found that batteries made according to this invention have improved shelf-life as compared to solid-state batteries heretofore available. We have also found that our batteries are not affected adversely by wide variations in ambient temperatures. Accordingly, the primary object of the present invention is to provide an improved primary electro-chemical cell which has a high voltage, high current drain, and a long shelf life, which may be employed in the construction of solid-state batteries having the same desirable characteristics. A further object of the invention is to provide an electro-chemical cell of such character that it can be constructed, and will perform efficiently, in different sizes, so that it may be equally capable of serving as the basis for a miniature battery or one of large size. It is also an object of the present invention to provide a primary electro-chemical cell in which the usable current drain does not polarize the cell, and thus lead to a gradual reduction of its voltage and useful life.

The functional characteristics of a solid-state battery depend to a great extent on the composition of the solid electrolyte which serves as an ionic conductor between the electrodes of the individual cells from which the battery is assembled. The ionic conductivity of the electrolyte, or the mobility of ions therethrough, determines the rate at which the chemical changes within the cell occur, and also the nature of the changes, and thus affect the useful life, the voltage and current characteristics of the cell. In most instances, it is desirable that the composition of the solid electrolyte be such that the ionic conductivity is at a high level but, at the same time, such that the cell will not be shorted through the electrolyte. It is also necessary that the composition of the electrolyte be such that polarization of the cell is minimized, and preferably entirely avoided, and that chemical action within the cell does not have side effects which prematurely destroy or incapacitate any component of the cell. We have found that a solid electrolyte may be substantially improved in all the foregoing respects, and to an unexpected degree, by incorporating tellurium into the electrolyte, in certain percentages by weight of the electrolyte. More specifically, we have found that the addition of 3 to 10% tellurium to a solid electrolyte results in a substantial and permanent increase in the open circuit voltage and in the useful current produced by a solid-state electro-chemical cell. It has been found that the improvement in the ionic conductivity of a solid electrolyte by tellurium is confined largely to the addition of about 3–10%, and that amounts outside of this range have inappreciable effect, so that the advantages achieved by the addition of tellurium apparently cannot be attributed to the conductivity of tellurium itself. It has also been found that the optimum improvement achieved by the addition of tellurium occurs when it is used in the amount of 5%, by weight, of the electrolyte.

The precise reasons why the addition of tellurium to the electrolyte in a solid-state cell has the described effects are not clearly understood. Presently accepted theory regarding solid-state cells postulates that a solid electrolyte composition (an ionic conductor) has a defect-lattice structure with the normal ions moving relatively freely as interstitial atoms, and has vacant lattice points or holes normally occupied by the moving ions. The addition of tellurium to such an electrolyte apparently results in the formation of compounds which further alter the lattice structure to enhance the characteristics which initially made it suitable as a solid electrolyte, or make more readily available ions which migrate into the vacant lattice points or holes. However, the present invention is not limited to any particular theory or explanation of the effect of tellurium in the electrolyte, nor to the specific illustrations of the invention which are set forth below in order to further illustrate and explain it.

The advantageous enhancing of the ionic conductivity of a solid electrolyte by the addition of tellurium is shown below by the comparison of the electrical conductivity of solid silver chloride, a common solid-state electrolyte, in its pure form, with the conductivity of the same salt with tellurium added.

The comparison was carried out as follows:

Molten, pure, silver chloride was poured between two silver strips held 3 mm. apart in a porcelain combustion boat. The boat was then heated sufficiently to smooth out the molten silver chloride and allowed to adhere to the silver strips. Kel-F coated wire was mechanically fixed to the silver strips. The resistance of the solid solutions was measured on a voltohmyst meter at three temperatures. The results are indicated below:

| Solid Solution | Temperature, °C. | Resistance, ohms. |
|---|---|---|
| Pure AgCl | 24 | $1 \times 10^8$ |
|  | 100 | $7.7 \times 10^6$ |
|  | 200 | $4.6 \times 10^5$ |
| AgCl+0.5% Te | 24 | $3 \times 10^8$ |
|  | 100 | $1.8 \times 10^7$ |
|  | 200 | $2 \times 10^5$ |
| AgCl+5% Te | 21 | $3.1 \times 10^5$ |
|  | 100 | $2.3 \times 10^3$ |
|  | 200 | $0.46 \times 10^3$ |

It was noticed that the cell resistances did not increase from the improved values which they attained as a result of the heating when the cells were subsequently cooled. Such heating, therefore, represents a manner in which the solid electrolyte cells may be further improved before being put to use.

It is apparent from the foregoing results that the addition of tellurium to the silver chloride electrolyte substantially increased the ionic conductivity, and it was further noted that the increase in ionic conductivity was not of such nature that shorting through the electrolyte occurred when the electrolyte was employed in a thin layer (1 mil) between anode and cathode of a cell.

The nature and best mode of application of the invention may be further understood from the following examples:

Example I

A primary, solid-state electro-chemical cell was produced by first fusing together into a solid solution 19 grams of silver chloride and 1 gram of tellurium. Sheets of 5 mil. silver were fuse-coated on one side with the solution of silver chloride and tellurium. Discs of ¾" in diameter were then punched from the coated sheet. The electrolyte side of the discs was thereupon coated with a solution of 2.5 gram of $CuCl_2$ in 10 mil. of methanol in which 1 gram of 10% "Glydag B" (colloidal graphite in 1,3 butylene glycol) was dispersed. The discs were then dried at 110° C. The primary cell thus prepared comprised a silver anode, a solid-state electrolyte of silver chloride and tellurium and a cathode of $CuCl_2+C$. Six cells of this kind in series were stacked in a Lucite tube, and uncoated silver discs were placed at each end of the stack to serve as electrodes. Silver wires, soldered to these discs, protruded through the closed ends of the Lucite tube for connection to leads. The individual cells of the battery thus formed were pressed firmly in contact with one another.

Four other sets of six cells each were similarly formed into batteries except that the composition of the electrolyte of each set was varied, in one case pure silver chloride being used and in the others a combination of silver chloride with .01% tellurium, .1% tellurium, and .5% tellurium, respectively. The five batteries thus constructed were tested with the following results:

| Electrolyte | O.C.V. | Meter Shunts, Ohms | | | Flash Current, microamperes |
|---|---|---|---|---|---|
| | | $10^{11}$ | $10^9$ | $10^5$ | |
| Pure AgCl | 3.0 | 3.0 | 3.0 | 1.05 | 6 |
| AgCl+0.01% Te | 2.0 | 2.0 | 1.85 | 0.2 | 2 |
| AgCl+0.1% Te | 1.8 | 1.8 | 1.6 | 0.1 | 2 |
| AgCl+0.5% Te | 2.3 | 2.3 | 2.0 | 0.2 | 1-2 |
| AgCl+5% Te | 3.1 | 3.1 | 3.05 | 1.5 | 23 |

Example II

In a further application of the invention, an electrolyte comprising silver bromide plus 5% by weight, of tellurium was flame-coated on one side of a 5 mil. silver sheet in a layer of about 1 mil. thickness. A disc of about ¾" diameter was punched out from this coated sheet. A good grade of semi-quantitative (No. 2) filter paper was then saturated with a solution consisting of 2.5% gram cupric bromide and one gram "Dag" dispersion No. 154 (20% iso-propanol dispersion of colloidal graphite) in 10 mil. of methanol. The paper was then dried and a ¾" diameter disc was punched therefrom. The silver disc coated with the electrolyte and the cupric bromide paper disc were placed firmly in contact with one another. The following voltage readings were obtained:

| O.C.V. | Shunts, Ohms | | | | |
|---|---|---|---|---|---|
| | $10^{10}$ | $10^9$ | $10^8$ | $10^7$ | $10^6$ |
| 0.76 | 0.76 | 0.76 | 0.76 | 0.74 | 0.64 |

Example III

A number of cells having a solid electrolyte comprising silver bromide and varying percentages of tellurium, by weight, were made as follows. The electrolyte compositions for the cells were prepared by fusing silver bromide with the following proportions of tellurium by weight, of the total respectively, .01%, 0.1%, 1.0%, 3.0%, 5.0%, 7.0% and 10.0%. In addition, one cell was prepared with an electrolyte of pure silver bromide. These various electrolyte compositions were applied by rubbing them onto a piece of 5 mil. silver sheet, which had been previously cleaned with a 35% nitric acid solution and a wash of de-ionized water, while the sheets were held over flame. The electrolyte coating was made to a thickness of 2–3 mils. The cathodes of the series were prepared by impregnating filter paper with a 5% "Aquadag" dispersion having the following composition: 11 parts "Aquadag" (22% graphite), 33 parts of de-ionized water, and 2 drops Tween 80. After drying, this impregnated paper was further impregnated with a 25% solution of cupric bromide in methanol. The impregnated paper was then dried and cut into discs. These discs were then fixed to the center of the electrolyte-coated side of the silver disc after a 1" copper disc had been placed on the other side of the paper. The discs were held firmly in contact with one another. The cells thus formed exhibited the electrical properties indicated below:

| Electrolyte | O.C.V. | Meter Shunts, Ohms. | | | | Cell Resistance | Current at Load Equal to Cell Resistance, microamp. |
|---|---|---|---|---|---|---|---|
| | | $10^9$ | $10^8$ | $10^7$ | $10^6$ | | |
| Pure AgBr | 0.80+ | 0.80+ | 0.80+ | 0.80+ | 0.73 | 114K | 3 |
| AgBr+0.01% Te | 0.80+ | 0.80+ | 0.80− | .75⁵ | .49⁵ | 599K | 1 |
| AgBr+0.1% Te | .80 | .80 | .79⁵ | .76 | .57 | 323K | 1-2 |
| AgBr+1% Te | .80 | .79 | .77 | .74 | .60 | 178K | 2 |
| AgBr+3% Te | .80 | .80 | .80 | .79 | .71 | 70K | 4 |
| AgBr+5% Te | .80 | .80 | .80 | .79⁵ | .78 | 18K | 16 |
| AgBr+7% Te | .73 | .73 | .72⁵ | .72 | .69 | 24K | 11 |
| AgBr+10% Te | .71+ | .71 | .71 | .71 | .68⁵ | 31K | 8 |

The cell resistance was measured by applying an external load until the O.C.V. was reduced to one-half, making the load resistance equal to the cell resistance. Cells were also observed for the effect of prolonged exposure to air and for shelf life characteristics. No substantial change in the characteristics of the cell was noted following prolonged exposure in the air, and, characteristically, the cell comprising the electrolyte with 5%, by weight, of tellurium after 31 days exhibited an O.C.V. of .74, cell resistance ($Ri$) of 1.8 K and current at $Ri$ of 80 microamperes.

A study of the temperature dependency of these cells was made at 50° C., 29° C., and at about −75° C., the results indicating that the cells had outstanding performance characteristics throughout this temperature range. The results with the cell comprising the electrolyte of silver bromide with 5%, by weight, of tellurium, and compared with that having the electrolyte of silver bromide alone, being indicative of this.

| Cell | Temperature, °C. | O.C.V. | $Ri$ | $IRi$, μa. | F.C., μa. |
|---|---|---|---|---|---|
| AgBr | 50 | 0.79 | 13K | 25 | 50-60 |
| | 29 | .77 | 65 | 5 | 8 |
| | ca.−75 | .74⁵ | 2 megohms | (¹) | <1 |
| AgBr+5% Te | 50 | .76 | 1.5K | 200 | 600 |
| | 29 | .74 | 1.8 | 80 | 200 |
| | ca.−75 | .54 | 600 | (¹) | 1 |

¹ Too low for detection on Simpson meter.

Example IV

A primary, solid-state cell was made by preparing a solid electrolyte consisting of AgI with, respectively, 5%, 10%, 12.5% and 15% tellurium, by weight. Sheets of 5 mil. silver were fuse-coated on one side with these solid electrolyte compositions. Thereafter, discs of about one inch in diameter were punched from the coated sheet. The side having the solid electrolyte was then coated with a solution consisting of $CuBr_2$ and a dispersion of colloidal graphite. This provided the counter electrode with the conductive graphite required to tap this electrode. The cells thus prepared comprised a silver anode, a solid-state electrolyte of AgI and tellurium, and a cathode of $CuBr_2$. Upon test it was found that the cell having the electrolyte of AgI plus 5% tellurium at room temperature showed a voltage of .72 through a resistance of $10^5$ ohms at room temperature, the cell having the 10% tellurium in the electrolyte showed a voltage of .75 through a resistance of $10^6$ ohms, and that having 12.5% tellurium was .72 volt through a resistance of $10^5$ ohms. It was found that electronic conduction occurred through the electrolyte containing the 15% or more tellurium.

Due to the instability of the AgI electrolyte, the cell did not exhibit storage characteristics approaching those having the silver chloride and silver bromide electrolytes, but was nevertheless an improvement over those comprising an electrolyte of AgI alone. Other cells, showing similar improvement, were made in the same way except that a solution of iodine and colloidal graphite was employed to deposit the cathode in lieu of the $CuBr_2$ and colloidal graphite.

It will be appreciated that other techniques may be employed in constructing the primary cells of the kind herein disclosed. For example, a primary cell was constructed by rolling a layer of silver bromide and 5% tellurium onto a sheet of silver. This silver sheet was approximately .002 inch in thickness and about 2" wide. The layer of silver bromide plus 5% tellurium was applied in a thickness of .002 inch. The silver bromide plus tellurium electrolyte material was "clad" onto the silver according to techniques which are understood in the art. The silver side of this two-layer sheet was then sprayed with a solution of an adhesive binder (epoxy resin in this case) and colloidal graphite to provide an electronically conductive film .001 inch in thickness which serves to tap the silver (anode) and protect it from attack by the halide constituent of the cathode of an adjacent cell when a multiplicity of cells are assembled into a battery.

The solid electrolyte material which was clad to the silver was prepared by melting silver bromide powder in a crucible and thereafter mixing in the 5% by weight of tellurium. The two components are thus fused together and then cast into ingots. The ingots thus provided are handled in the usual way in applying the silver bromide plus tellurium to the silver sheet.

The counter electrode (cathode) was prepared by making a concentrated solution of copper bromide ($CuBr_2$) in hot water. This was done by adding 67 grams of copper bromide in sufficient hot water to dissolve it, which was approximately 100 cubic centimeters. To this was added 150 grams of an aqueous dispersion of colloidal graphite. The solids content of this dispersion was about 22%, so that the dispersion had the consistency of a paste, the density being about 9 pounds per gallon. The particle size of the colloidal graphite was about 1 micron or less.

Upon the addition of the colloidal dispersion, the mixture had a pasty consistency. This mixture of graphite and copper bromide was used to print the counter electrode upon the solid electrolyte of silver bromide plus tellurium. The counter electrode was thereupon dried and cells punched from the strip. The characteristics of the cells formed in this manner were at least as good as the silver bromide plus tellurium cells described above. It was found that marked improvement resulted from forming the counter electrode in the manner described immediately above. For example, the use of the aqueous dispersion of colloidal graphite having its particle size limited as described, provided a mixture which could be readily printed to form the counter electrode. This desirable result was not obtained with other dispersions of graphite which had either a larger particle size or were dispersed in the organic solvents. Such dispersions resulted in an electrode mixture which was not coherent or adherent and which was more easily removed or displaced by chemicals. It was also found that the dispersions of colloidal graphite in liquids which included organic solvents did not dry out to form a a film having the same skin appearance as the better performing electrode film deposited from the aqueous dispersion having the particles of one micron or less. A further advantage following from the use of the aqueous dispersion described is that the electrode exhibited improved electrical characteristics and made possible a higher current drain from the cell.

Cells of the kind described in the examples above were also formed with silver electrodes to which the solid electrolyte was laminated under pressure. For example a biclad material was prepared by fusing the silver bromide and tellurium onto a silver sheet using 102 mgm. of this solid electrolyte for each square centimeter of silver. These sections were then placed between hot plates whose faces were formed of stainless steel, and one of these plates had a countersunk depression of 10 mils. The two plates were heated to about 250°–300° C., after placing the biclad material between them and pressures varying from 100 to 1000 p.s.i., in different instances, were applied. This resulted in a smooth dense laminated material comprising a sheet of silver and an overlay of silver bromide and tellurium, which served to provide the silver anode and solid electrolyte of a cell.

A preferred form of the invention, therefore, comprises the use of a counter electrode which is deposited from a solution comprising an aqueous dispersion of colloidal graphite having a particle size of one micron or less.

The cell system employing silver bromide and tellurium as the electrolyte is the preferred one of those described above, in that the silver bromide is more conductive than the chloride, it has a higher E.M.F., and the cupric bromide is less hygroscopic than the chloride.

It will be appreciated that any of the silver halide salts may be used with tellurium as an electrolyte and will have improved properties over the halide salt used alone. For most applications, the bromides and chlorides are more suitable, but silver iodide may be used in some instances, since it is generally considered a better ionic conductor than the bromide. However, in most cases it is less usable than the bromide and chloride because of its instability. Other solid-state electrolytes which may be advantageously modified by the addition of tellurium include, for example, the halides of mercury, antimony, bismuth, and lead. It will also be appreciated that the composition of the electrodes may be varied from those described. As understood in the art, metals such as strontium, barium, rubidium, and others may be employed as anodes and that gaseous elements absorbed in surface layers of a solid material, and oxidizing salts may be employed as cathodes.

Having thus described the invention what is claimed as new is:

1. An electro-chemical cell having a solid electrolyte consisting essentially of a halide selected from the group consisting of chlorides, bromides and iodides and 3–10%, by weight, of tellurium.

2. An electro-chemical cell having a silver anode, and a solid electrolyte consisting essentially of a halide selected from the group consisting of chlorides, bromides and iodides, and 3–10%, by weight, of tellurium.

3. An electro-chemical cell having a silver anode and a solid electrolyte consisting essentially of silver bromide and 3–10%, by weight, of tellurium.

4. An electro-chemical cell having a silver anode, a cupric bromide cathode and a solid electrolyte consisting essentially of silver bromide and 3–10%, by weight, of tellurium.

5. A primary cell having a solid electrolyte and spaced apart electrodes in contact therewith, said electrolyte consisting essentially of a halide selected from the group consisting of chlorides, bromides and iodides, and 3–10%, by weight, of tellurium.

6. A battery comprising an electrically interconnected assembly of cells of the kind claimed in claim 1.

7. A method of preparing an electrolyte comprising melting together a solid crystalline ionic conductor selected from the group consisting of chlorides, bromides and iodides, and 3–10%, by weight, of tellurium.

8. An electro-chemical cell having a solid electrolyte consisting essentially of an iodide and more than 3% to less than 15% tellurium.

References Cited in the file of this patent

UNITED STATES PATENTS

| | | |
|---|---|---|
| 2,418,792 | Riggs | Apr. 8, 1947 |
| 2,605,300 | Shirland | July 29, 1952 |
| 2,658,099 | Basset | Nov. 3, 1953 |
| 2,690,465 | Broder | Sept. 28, 1954 |
| 2,700,064 | Akerman | Jan. 18, 1955 |
| 2,715,150 | Gritman et al. | Aug. 9, 1955 |
| 2,715,151 | Gritman et al. | Aug. 9, 1955 |
| 2,793,244 | Van Der Grinten | May 21, 1957 |